(12) United States Patent
Liao et al.

(10) Patent No.: US 8,593,608 B2
(45) Date of Patent: Nov. 26, 2013

(54) THREE-DIMENSIONAL DISPLAY

(75) Inventors: Ren-Wei Liao, Hsinchu County (TW);
Meng-Chieh Tsai, Taipei County (TW);
Chih-Wen Chen, Tainan (TW);
Chih-Hung Shih, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 457 days.

(21) Appl. No.: 12/909,832

(22) Filed: Oct. 22, 2010

(65) Prior Publication Data

US 2011/0149392 A1 Jun. 23, 2011

(30) Foreign Application Priority Data

Dec. 22, 2009 (TW) ................................ 98144319 A

(51) Int. Cl.
*G02F 1/1343* (2006.01)

(52) U.S. Cl.
USPC .......................................................... 349/146

(58) Field of Classification Search
USPC .......................................................... 349/146
See application file for complete search history.

(56) References Cited

U.S. PATENT DOCUMENTS

| 7,306,982 | B2 | 12/2007 | Yamazaki et al. | |
|---|---|---|---|---|
| 8,063,931 | B2 | 11/2011 | Saishu et al. | |
| 2002/0126389 | A1* | 9/2002 | Moseley et al. | 359/619 |
| 2004/0246426 | A1* | 12/2004 | Wang et al. | 349/146 |
| 2005/0041188 | A1* | 2/2005 | Yamazaki | 349/146 |
| 2006/0176434 | A1 | 8/2006 | Kim et al. | |
| 2007/0008495 | A1* | 1/2007 | Miyagaki et al. | 353/31 |
| 2008/0079662 | A1 | 4/2008 | Saishu et al. | |
| 2009/0167846 | A1* | 7/2009 | Niioka et al. | 348/54 |
| 2010/0149450 | A1* | 6/2010 | Okumura | 349/57 |

FOREIGN PATENT DOCUMENTS

| CN | 101546500 | 9/2009 |
|---|---|---|
| JP | 06035418 | 2/1994 |
| TW | 200839294 | 10/2008 |

OTHER PUBLICATIONS

"First Office Action of China Counterpart Application", issued on Nov. 26, 2010, p. 1-5, in which the listed references were cited.
"Office Action of Taiwan Counterpart Application", issued on Jun. 21, 2013, p. 1-5, in which the listed reference (TW200839294) was cited.

* cited by examiner

Primary Examiner — Eric Wong
(74) Attorney, Agent, or Firm — Jianq Chyun IP Office

(57) ABSTRACT

A three-dimensional display includes a display panel having a plurality of first pixels arranged in the odd row, and a plurality of second pixels arranged in the even row. Each first pixel has a first and a second transparent regions and a first semiconductor pattern. Each second pixel has a third and a fourth transparent regions and a second semiconductor pattern. In any two adjacent first and second pixels, the first and the third transparent regions are mirror images of each other, and the second and the fourth transparent regions are mirror images of each other. In the adjacent first and second pixels arranged in any two rows, the loss of the light transmittance at any position along the row direction due to overlapping of the first semiconductor and the first transparent region and overlapping of the second semiconductor and the fourth transparent region remains unchanged.

18 Claims, 6 Drawing Sheets

THREE-DIMENSIONAL DISPLAY

CROSS-REFERENCE TO RELATED APPLICATION

This application claims the priority benefit of Taiwan application serial no. 98144319, filed on Dec. 22, 2009. The entirety of the above-mentioned patent application is hereby incorporated by reference herein and made a part of this specification.

BACKGROUND OF THE INVENTION

1. Field of the Invention

The present invention is related to a display, and more particular to a three-dimensional display.

2. Description of Related Art

Currently, continuous advancement of display technologies results in increasing demands on display quality of displays, such as image resolution, color saturation, and so on. Further, in process of purchasing a display, whether the display is able to display 3D images is also taken into consideration in addition to high image resolution and high color saturation.

In current 3D image display technologies, a barrier mainly utilized for controlling images captured in respective eyes of a viewer is configured between the display panel and the user. According to visual characteristics of human eyes, a 3D image may be produced when two images with the same content but different parallax are respectively captured by a viewer's left and right eyes. The images respectively captured by a viewer's left and right eyes respectively pass through the slits of the barrier.

Since, in the display panel, the geometric arrangement relationships of the black matrix regions or the metal wiring regions are in accordance with the extending direction of the slits of the barrier, it is easy to produce uneven fringes after the light beam from the display panel passes through the barrier. Under the circumstance mentioned above, it is easy for the viewer to see the 3D image accompanied with equidistant bright-and-dim fringes. That is, the so-called Moire effect. Thus, the display quality of the 3D display is seriously affected.

Particularly, when the display panel uses a low-temperature polysilicon active device array substrate, the non-completely-transparent polysilicon wirings lead to a worse light strength distribution in each of the pixel of the display panel. Hence, the Moire effect is getting more obvious. Therefore, how to prevent the 3D display from the Moire effect at the time for improving the display quality of the 3D display becomes the major task to be developed immediately.

SUMMARY OF THE INVENTION

The present invention provides a three-dimensional display capable of preventing the Moire effect and further improving the display quality.

The present invention provides a three-dimensional display including a lenticular lens array and a display panel. The lenticular lens array comprises a plurality of lenticular lenses extending along directions parallel to each other. The display panel is configured under the lenticular lens array. The display panel comprises a plurality of scan lines, a plurality of data lines, a plurality of first pixels and a plurality of second pixels. The scan lines interlace the data lines to define a plurality of non-rectangular pixel regions. Further, the first pixels are configured on odd rows of the non-rectangular pixel regions and the second pixels are configured on even rows of the non-rectangular pixel regions. Moreover, each first pixel has a first transparent region, a second transparent region and a first semiconductor pattern partially overlapping the first transparent region. In addition, each second pixel has a third transparent region, a fourth transparent region and a second semiconductor pattern partially overlapping the fourth transparent region. In any two adjacent first pixel and second pixel, the first transparent region and the third transparent region are mirror images of each other. Also, in any two adjacent first pixel and second pixel, the second transparent region and the fourth transparent region are mirror images of each other. In the adjacent first pixel and second pixel in any two rows, a transmittance loss at any position along a row direction of the odd rows and the even rows due to a portion of the first semiconductor pattern overlapping the first transparent region and due to a portion of the second semiconductor pattern overlapping the fourth transparent region remains unchanged.

The present invention provides a three-dimensional display including a parallax barrier and a display panel. The parallax barrier includes a plurality of slits extending along directions parallel to each other. The display panel is configured under the parallax barrier. The display panel comprises a plurality of scan lines, a plurality of data lines, a plurality of first pixels and a plurality of second pixels. The scan lines interlace the data lines to define a plurality of non-rectangular pixel regions. Further, the first pixels are configured on odd rows of the non-rectangular pixel regions and the second pixels are configured on even rows of the non-rectangular pixel regions. Moreover, each first pixel has a first transparent region, a second transparent region and a first semiconductor pattern partially overlapping the first transparent region. In addition, each second pixel has a third transparent region, a fourth transparent region and a second semiconductor pattern partially overlapping the fourth transparent region. In any two adjacent first pixel and second pixel, the first transparent region and the third transparent region are mirror images of each other. Also, in any two adjacent first pixel and second pixel, the second transparent region and the fourth transparent region are mirror images of each other. In the adjacent first pixel and second pixel in any two rows, a transmittance loss at any position along a row direction of the odd rows and the even rows due to a portion of the first semiconductor pattern overlapping the first transparent region and due to a portion of the second semiconductor pattern overlapping the fourth transparent region remains unchanged.

In one embodiment of the present invention, an extending direction of each of the lenticular lenses is perpendicular to the row direction.

In one embodiment of the present invention, an extending direction of each of the slits is perpendicular to the row direction.

In one embodiment of the present invention, the display panel includes a liquid crystal display panel.

In one embodiment of the present invention, the data lines tortuously extend along the row direction and the scan lines tortuously extend along a column direction perpendicular to the row direction.

In one embodiment of the present invention, the first transparent regions, the second transparent regions, the third transparent regions and the fourth transparent regions are trapezoid-like transparent regions.

In one embodiment of the present invention, the three-dimensional display further comprises a plurality of common lines, wherein each of the common lines is configured between two adjacent scan liens.

In one embodiment of the present invention, each of the first semiconductor patterns is electrically connected to one of the data lines, and each of the second semiconductor patterns is electrically connected to one of the data lines.

In one embodiment of the present invention, each of the first semiconductor patterns has a first capacitor electrode, and each of the second semiconductor patterns has a second capacitor electrode, and the first capacitor electrode and the second capacitor electrode respectively is coupled to the common line to form a storage capacitor.

In one embodiment of the present invention, the first pixel configured between the Nth data line and the (N−1)th data line is electrically connected to the (N+1)th data line. In one embodiment of the present invention, the second pixel configured between the Mth data line and the (M−1)th data line is electrically connected to the (M+1)th data line, and N is an even number when M is an odd number, and N is the odd number when M is the even number.

Accordingly, the present invention utilizes the layout with non-rectangular pixel regions to improve the Moire effect. Furthermore, the particular transparent regions in two adjacent pixels are arranged to be mirror images of each other and the transmittance loss of the pixels at any position along a row direction of the odd rows and the even rows remains unchanged. Hence, the problem caused by the Moire effect in the three-dimensional display can be effectively overcome and the display quality of the three-dimensional display can be improved.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
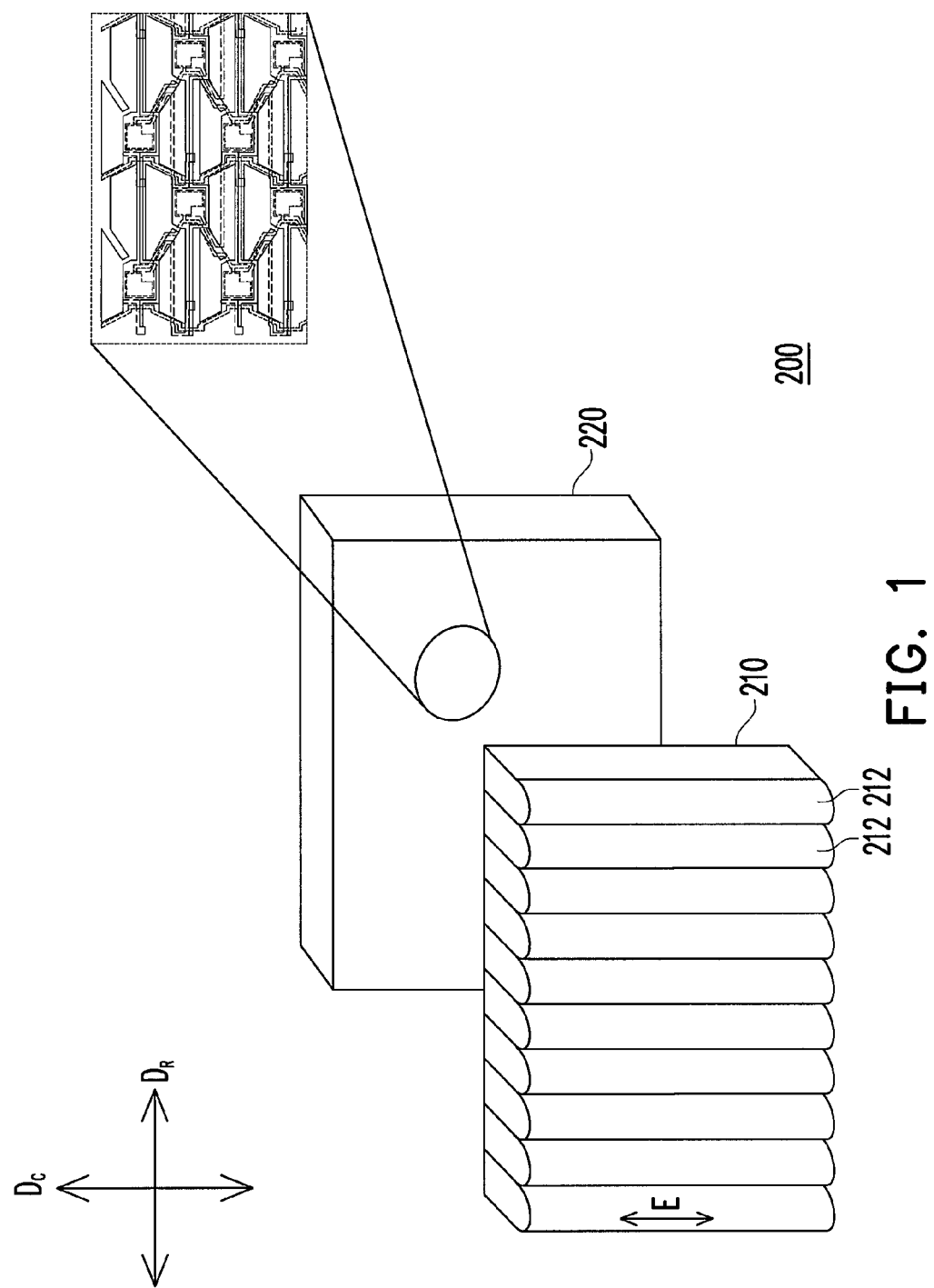
FIG. 1 schematic top view of a three-dimensional display according to one embodiment of the present invention.

FIG. 1 schematic top view of a three-dimensional display according to one embodiment of the present invention. As shown in FIG. 1A, a three-dimensional display 200 of the present embodiment includes a lenticular lens array 210 and a display panel 220. The display panel 220 can be, for example, a liquid crystal display panel. The lenticular lens array 210 is configured in front of the display panel 220 so that the image displayed by the display panel 220 passes through the lenticular lens array 210 and is captured by both eyes of the viewer. Accordingly, the viewer can observe a three-dimensional image. Specifically, the lenticular lens array 210 comprises a plurality of lenticular lenses 212 extending along extending directions E which are parallel to each other. In the present embodiment, the extending direction E of each of the lenticular lenses 212 is perpendicular to a row direction $D_R$ of the pixel regions (which are described below), and the extending direction E of each of the lenticular lenses 212 is parallel to a column direction of the pixel regions, as shown in FIG. 1. It should be noticed that the particular pixel design is applied on the display panel 220 of the present invention to destroy the uniformity of the geometric relationship between the layouts of the pixels and the lenticular lens array. Hence, while the three-dimensional display 200 displays a three-dimensional image, the Moire effect due to the unexpected overlap between the lenticular lenses in the lenticular lens array and the three-dimensional image can be avoided. Further, the display panel is detailed in the following paragraphs.

Figure 2A:
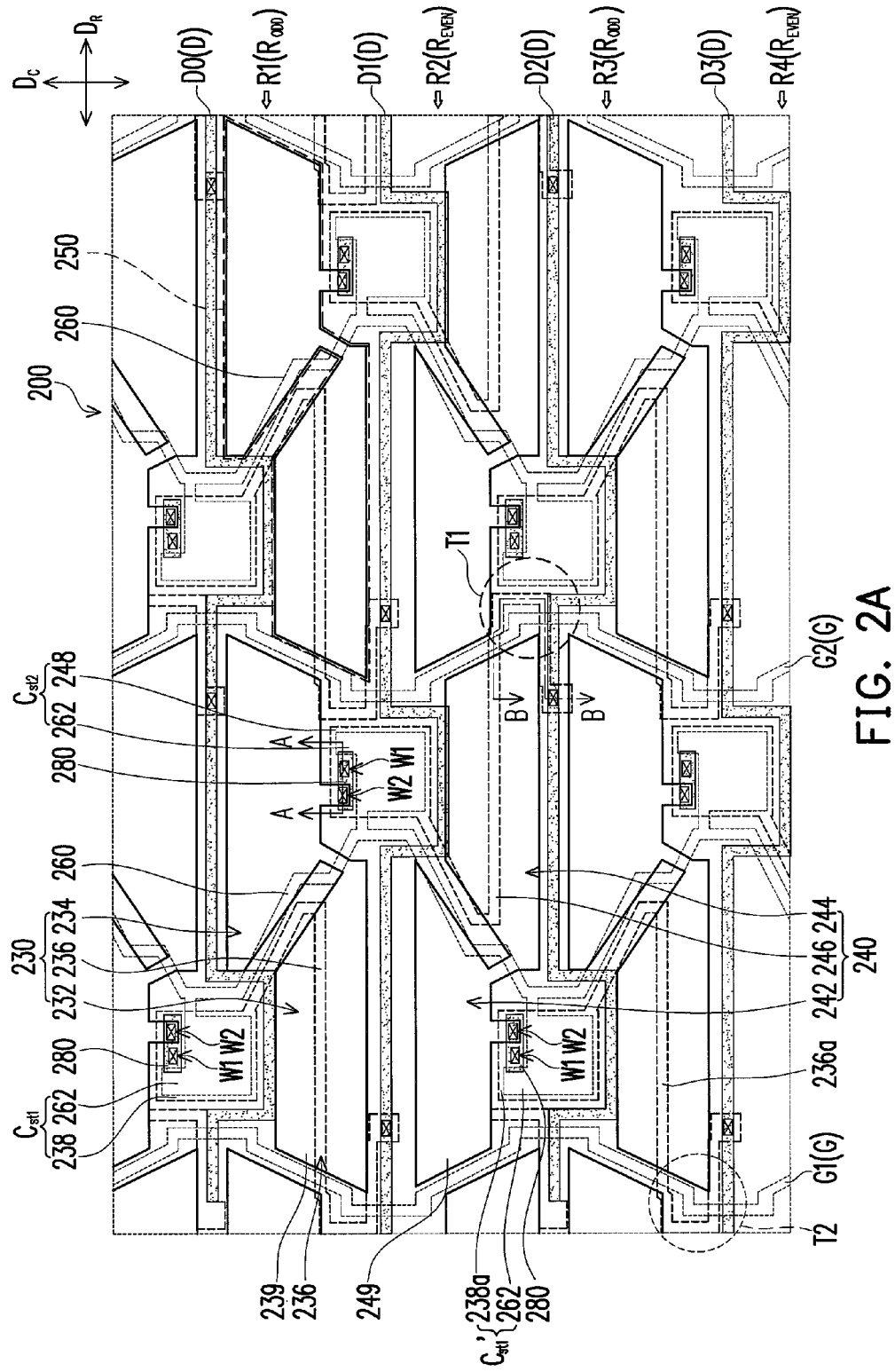
FIG. 2A is partial enlargement diagram of the display panel in the three-dimensional display shown in FIG. 1.

FIG. 2A is partial enlargement diagram of the display panel in the three-dimensional display shown in FIG. 1. More particular, FIG. 2A is the schematic view of the layout of the display panel being observed through a reflection of a light beam. In order to clarify, a perspective drawing technique is applied and different lines represent different film layers. As shown in FIG. 2A, the display panel 200 comprises a plurality of scan lines G, a plurality of data lines D, a plurality of first pixels 230 and a plurality of second pixels 240. The scan lines G interlace the data lines D to define a plurality of non-rectangular pixel regions 250. Further, the first pixels 230 are configured on odd rows $R_{ODD}$ of the non-rectangular pixel regions and the second pixels 240 are configured on even rows $R_{EVEN}$ of the non-rectangular pixel regions 250. More particularly, the data lines D tortuously extend along the row direction $D_R$ and the scan lines G tortuously extend along a column direction $D_C$ perpendicular to the row direction $D_R$. In other words, in the present embodiment, the data lines D, in macro-perspective, extend along the row direction $D_R$. For instance, the layouts of the data lines D have square-like waves. Moreover, the scan lines G approximately extend along the column direction $D_C$. For instance, the layouts of the scan lines G have sawtooth shapes conformal to the outer peripheries of the pixel regions 250. Hence, the pixel regions defined by the tortuously extending scan lines G and the tortuously extending data lines D are non-rectangular pixel regions 250. Consequently, the three-dimensional display 200 provides the display panel with a non-rectangular pixel region array. Since the periphery side of each of the pixel regions 250 in the non-rectangular pixel region array is not straight, the bright-and-dim borders of the pixel regions 250 in the same column of the non-rectangular pixel region array can be accordingly blurred. Thus, while the pixel regions 250 in the same column of the non-rectangular pixel region array are accompanied with the lenticular lens array 210 (as shown in FIG. 1), the viewer hardly observes the bright-and-dim borders. Hence, the non-rectangular pixel regions 250 contribute to the improvement of the Moire effect.

More particular, each of the first pixels 230 arranged on the odd rows $R_{ODD}$ has a first transparent region 232, a second transparent region 234 and a first semiconductor pattern 236 partially overlapping the first transparent region 232. In addition, each of the second pixels 240 on the even rows $R_{EVEN}$ has a third transparent region 242, a fourth transparent region 244 and a second semiconductor pattern 246 partially overlapping the fourth transparent region 244. Also, each of the first semiconductor patterns 236 is electrically connected to one of the data lines D, and each of the second semiconductor patterns 246 is electrically connected to one of the data lines D. The materials of the first semiconductor patterns 236 and the second semiconductor patterns 246 can be, for example, selected from a group comprising of single crystal silicon, polysilicon, amorphous silicon, oxide semiconductor, other proper material or the combination thereof.

Figure 2B:
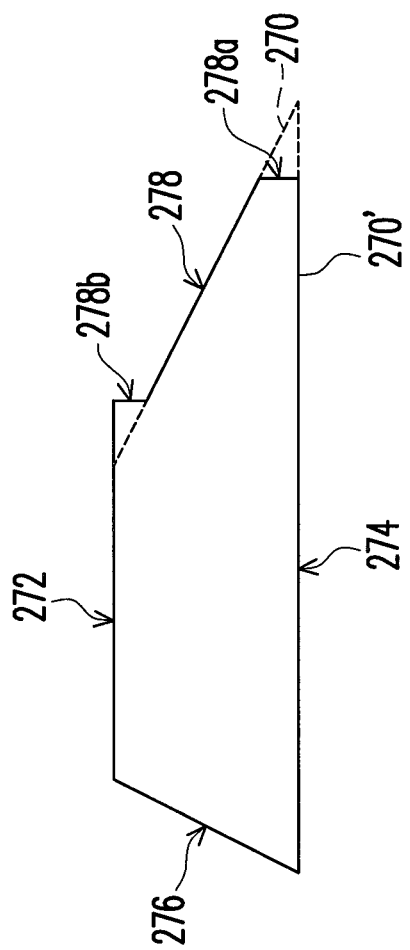
FIG. 2B is a schematic view showing a shape of the transparent region in FIG. 2A.

It should be noticed that, in any two adjacent first pixel 230 and second pixel 240, the first transparent region 232 and the third transparent region 242 are mirror images of each other. Also, in any two adjacent first pixel 230 and second pixel 240, the second transparent region 234 and the fourth transparent region 244 are mirror images of each other. For instance, in the present embodiment, the shapes of the first transparent region 232 and the third transparent region 242 are the trapezoid-like shapes except for the non-transparent regions of the signal lines underneath thereof. Further, the first transparent region 232 and the third transparent region 242 are symmetrical to each other with respect to the data line D (e.g. the data line D1 shown in FIG. 2). Similarly, the shapes of the second transparent region 234 and the fourth transparent region 244 are also the trapezoid-like shapes, and the second transparent region 234 and the fourth transparent region 244 are symmetrical to each other with respect to the data line D1. The shape of the so-called trapezoid-like region 270' (shown in FIG. 2B) means the shape of each of the transparent regions is analogous to the trapezoid shape. More particularly, please refer to the descriptions related to FIG. 2B. As shown in FIG. 2B, the trapezoid-like region 270' possesses an upper bottom 272, a lower bottom 274 and two bevel edges 276 and 278. In accordance with the layout of the adjacent pixel, the layout of the non-transparent region of the signal lines or the constant transmittance loss along the row direction, a portion of the bevel edge 278 with a relatively long length is trimmed to form a minor line segment 278a or an additional region is added on the bevel edge 278 to form a minor line segment 278b. Basically, the shape of the region 270 surrounded by the upper bottom 272, the lower bottom 274 and the two bevel edges 276 and 278 is the trapezoid shape, and the shape of trapezoid-like region 270' is analogous to the shape of the region 270. Also, the area of the trapezoid-like region 270' is similar to the area of the region 270.

As shown in FIG. 2A, more particularly, in the adjacent first pixel 230 and second pixel 240 in any two rows respectively, a transmittance loss at any position along the row direction $D_R$ of the odd rows and the even rows due to a portion of the first semiconductor pattern 236 overlapping the first transparent region 232 and due to a portion of the second semiconductor pattern 246 overlapping the fourth transparent region 244 remains unchanged.

Figure 2C:
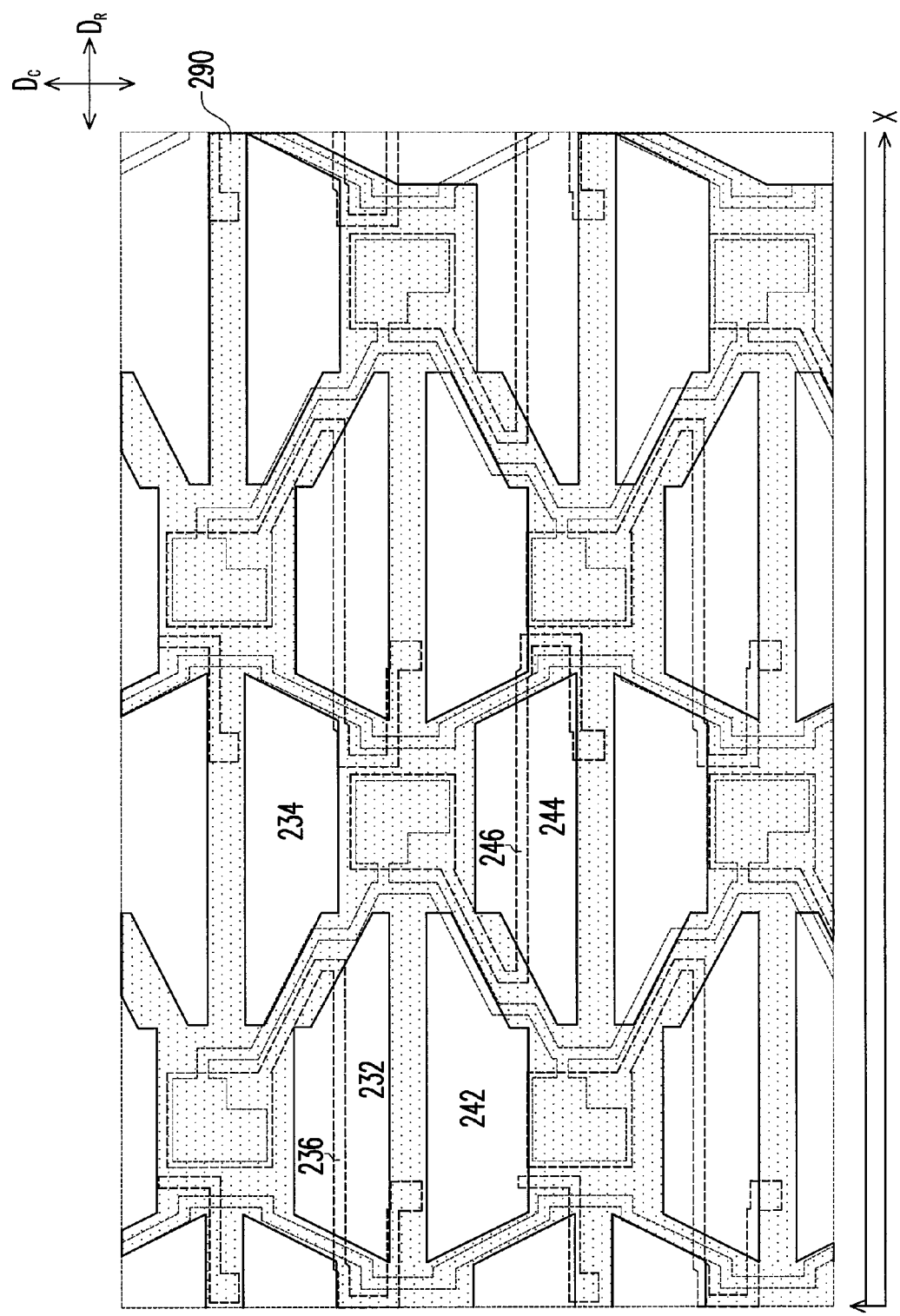
FIG. 2C is a schematic top view of the display panel in FIG. 2A.

FIG. 2C is a schematic top view of the display panel in FIG. 2A. In FIG. 2C, the metal wiring shown in FIG. 2A is covered by the black matrix 290 for clearly showing the brightness changes of the transparent regions and the non-transparent regions. Further, FIG. 2C only presents the layouts of the transparent regions and the non-transparent regions and ignores other film layers. That is, FIG. 2C is the schematic view of the layout of the display panel being observed through a reflection of a light beam. As shown in FIG. 2A and FIG. 2C, in the present embodiment, the first transparent region 232, the second transparent region 234, the third transparent region 242 and the fourth transparent region 244 are trapezoid-like transparent regions. Although portions of the first transparent region 232 and the fourth transparent region 244 lose portions of the transmittance due to partially overlapping with the semiconductor patterns respectively, in the adjacent first pixel 230 and second pixel 240 in any two rows, the transmittance loss at any position along the row direction $D_R$ due to a portion of the first semiconductor pattern 236 overlapping the first transparent region 232 and due to a portion of the second semiconductor pattern 246 overlapping the fourth transparent region 244 remains unchanged. Thus, the total transmittance at any position along the row direction $D_R$ is uniform and even.

In practice, the brightness changes of the pixel designs respectively shown in FIG. 2A and FIG. 2C along the row direction $D_R$ are further detected. At lower portion of FIG. 2C, ζ represents the brightness value measured at a position along the row direction $D_R$, and x represents the coordinates of the measured position along the row direction $D_R$. As shown in FIG. 2C, at a random picked position x along the row direction $D_R$, the measured brightness value ζ remains unchanged and is a constant. Accordingly, the transmittance loss due to the portion of the first semiconductor pattern 236 overlapping the first transparent region 232 and due to the portion of the second semiconductor pattern 246 overlapping the fourth transparent region 244 remains unchanged. Hence, even though it is necessary to adopt the polysilicon semiconductor patterns in the pixel for the reasons of the product standards or the requirements of electrical properties, the layouts of the semiconductor patterns in the pixels does not result in the uneven brightness along the row direction $D_R$, and the brightness uniformity of the whole pixels in the display panel 220 is improved. Accordingly, not only the Moire effect can be avoided but also the display quality of the three-dimensional display can be improved.

In order to clarify the operation mechanism of the image data writing of the first pixel 230 and the second pixel 240, the display panel 220 shown in FIG. 2A is used as an exemplar accompanying with the cross-sectional view of FIG. 2A along the line AA' in the following description.

Figure 3:
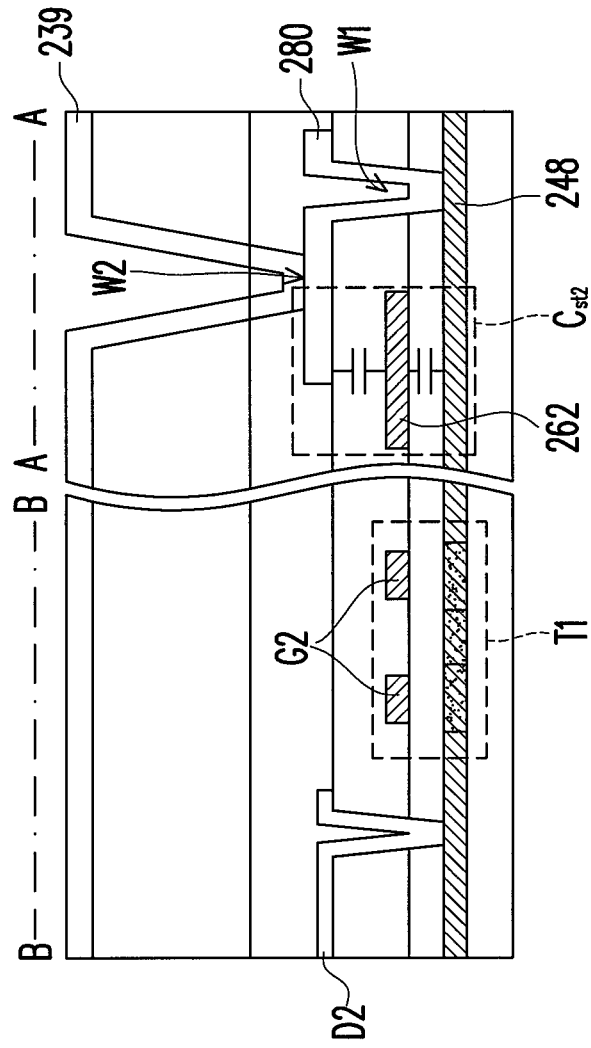
FIG. 3 is a cross-sectional view of FIG. 2 along line AA'.

FIG. 3 is a cross-sectional view of FIG. 2 along line AA'. As shown in FIG. 2A and FIG. 3, in the present embodiment, the three-dimensional display 200 further comprises a plurality of common lines 260. Each of the common lines 260 is configured between two adjacent scan lines G. Also, each of the first semiconductor patterns 236 is electrically connected to one of the data lines D, and each of the second semiconductor patterns 246 is electrically connected to one of the data lines D. For instance, in the present embodiment, the first semiconductor pattern 236 is electrically connected to the data line D1, and the second semiconductor pattern 246 is electrically connected to the data line D2. More particularly, each of the first semiconductor patterns 236 has a first capacitor electrode 238, and each of the second semiconductor patterns 246 has a second capacitor electrode 248. Also, each of the common lines 260 has a third capacitor electrode 262. Hence, the first capacitor electrode 238 of the first semiconductor pattern 236 is coupled to the third capacitor electrode 262 to form a first storage capacitor $Cst_1$, and the second capacitor electrode 248 of the second semiconductor pattern 246 is coupled to the third capacitor electrode 262 to form a second storage capacitor $Cst_2$.

As shown in FIG. 2A and FIG. 3, more clearly, the first pixel 230 configured between the Nth data line D and the (N−1)th data line D is electrically connected to the (N+1)th data line D. Further, the second pixel 240 configured between the Mth data line D and the (M−1)th data line D is electrically connected to the (M+1)th data line D, and N is an even number when M is an odd number, and N is the odd number when M is the even number. For instance, in the present embodiment, N is the odd number equal to 1 and M is the even number equal to 2. The first pixel 230 of the first row R1 is configured between the first data line D1 and the zero data line D0. It should be noticed that, practically, the first pixel 230 is electrically connected to the second data line D2 through the second capacitor electrode 248 of the second semiconductor pattern 246. Also, the second pixel 240 of the second row R2 is configured between the second data line D2 and the first data line D1. Similarly, the second pixel 240 is electrically connected to the third data line D3 through the first capacitor electrode 238a of the first semiconductor pattern 236a under the second pixel 240. The present embodiment accompanying with drawings are detailed in following description.

In order to clearly explain, the operation mechanism of the image data writing of the first pixel 230 is described first. As shown in FIG. 2A and FIG. 3, a transistor T1 of the first pixel 230 of the first row R1 is approximately located at the second row R2, and a turn-on voltage level is applied on the scan line G2 to turn on the transistor T1. Then, a pixel voltage from the data line D2 is inputted into the fourth capacitor electrode 280 through a first contact window W1, and then is inputted into the first pixel electrode 239 at the second transparent region 234 and at the first transparent region 232 from the fourth capacitor electrode 280 through the second contact window W2. Thus, the first pixel 230 operates according to the pixel voltage inputted into the first pixel electrode 239. Similarly, the operation mechanism of the image data writing of the second pixel 240 is described herein. A transistor T2 of the second pixel 240 of the second row R2 is approximately located at the third row R3, and a turn-on voltage level is applied on the scan line G1 to turn on the transistor T2. Then, a pixel voltage from the data line D3 is inputted into the fourth capacitor electrode 280 through a first contact window W1 at the first storage capacitor $Cst_1'$, and then is inputted into the second pixel electrode 249 at the third transparent region 242 and at the fourth transparent region 244 from the fourth capacitor electrode 280 through the second contact window W2 at the first storage capacitor $Cst_1'$. Thus, the second pixel 240 operates according to the pixel voltage inputted into the second pixel electrode 249. Hence, the first pixel 230 and the second pixel 240 in the display panel 220 can display the predetermined image according to the aforementioned operation mechanism for writing the corresponding pixel voltages into the pixels.

Figure 4:
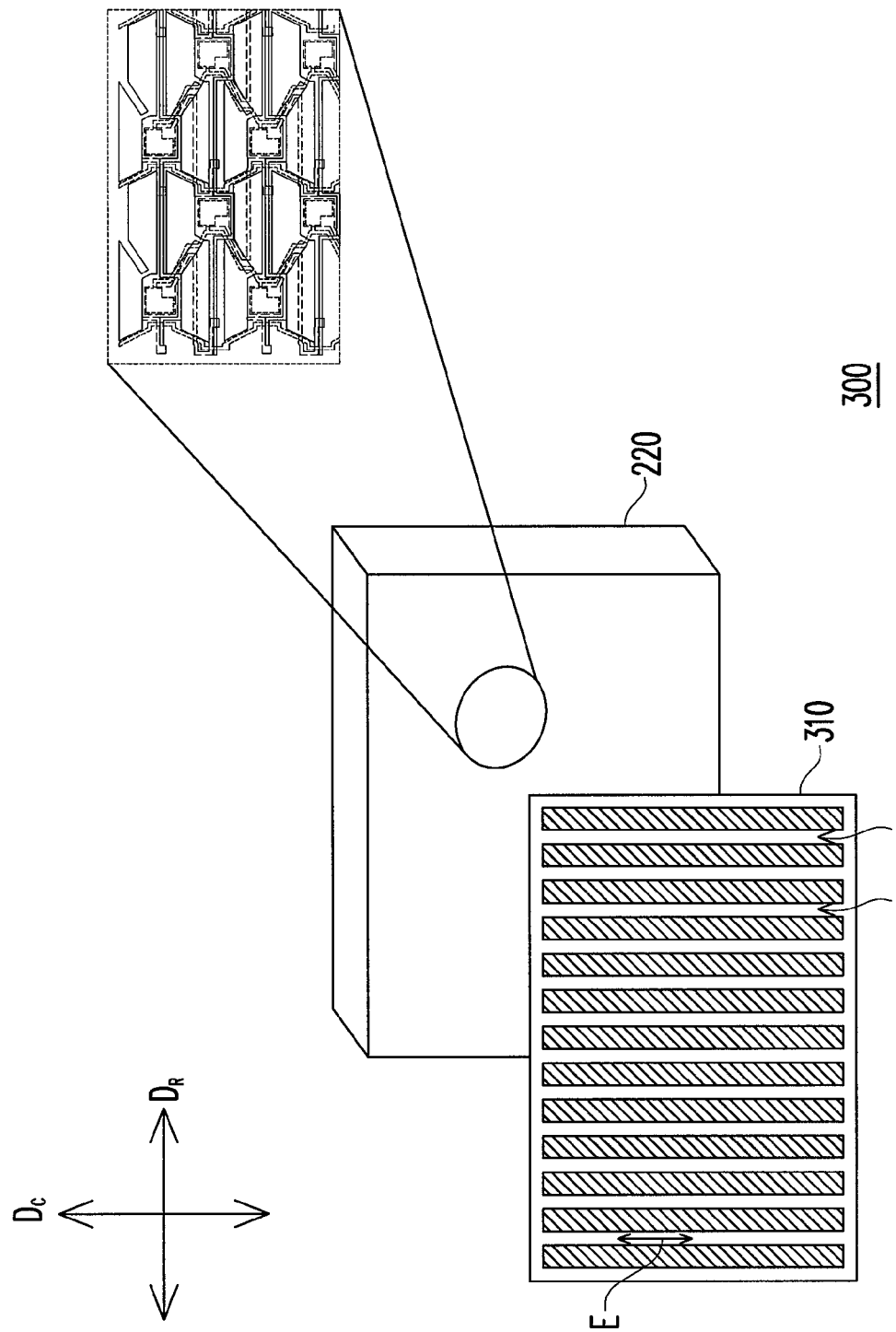
FIG. 4 schematic view of another three-dimensional display according to one embodiment of the present invention.

Of course, the three-dimensional display of the present invention can be other types of display. FIG. 4 schematic view of another three-dimensional display according to one embodiment of the present invention. As shown in FIG. 4, the three-dimensional display 300 of the present embodiment is similar to the three-dimensional display 200 of the aforementioned embodiment. However, the difference between the three-dimensional display 300 and three-dimensional display 200 is that the lenticular lens array used in the aforementioned embodiment is replaced by a parallax barrier in the present embodiment. That is, in the three-dimensional display 300 of the present embodiment, the parallax barrier 310 is used to replace the lenticular lens array (shown in FIG. 1). Also, the rest devices which are as same as those in the aforementioned embodiment are labeled with the reference numbers as same as those in the aforementioned embodiment. Specifically, the parallax barrier 310 comprises a plurality of splits 312 extending along extending directions E which are parallel to each other. In the present embodiment, the extending direction E of each of the splits 312 is perpendicular to the row direction $D_R$, and the extending direction E of each of the splits 312 is parallel to a column direction $D_C$ of the pixel regions, as shown in FIG. 4. It should be noticed that the particular pixel design is applied on the display panel 220 of the present invention to avoid the Moire effect due to the unexpected overlap between the slips in the parallax barrier and the three-dimensional image displayed by the three-dimensional display can be avoided. Also, the pixel design of the display panel is as same as that shown in the previous embodiment and is not detailed herein.

Accordingly, the three-dimensional display of the present invention provides the layout with non-rectangular pixel regions to improve the Moire effect. Furthermore, the pixel regions are divided into two transparent regions, and the particular transparent regions in two adjacent pixels are arranged to be mirror images of each other so that, when the semiconductor patterns are configured in the pixels, the transmittance loss of the pixels at any position along a row direction of the odd rows and the even rows remains unchanged. Hence, the problem caused by the Moire effect in the three-dimensional display in the conventional technique can be effectively overcome and the display quality of the three-dimensional display can be improved.

Although the invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A three-dimensional display, comprising:
   a lenticular lens array comprises a plurality of lenticular lenses extending along directions parallel to each other;
   a display panel configured under the lenticular lens array, wherein the display panel includes:
   a plurality of scan lines and a plurality of data lines, wherein the scan lines interlace the data lines to define a plurality of non-rectangular pixel regions;
   a plurality of first pixels configured on odd rows of the non-rectangular pixel regions, wherein each of the first pixels has a first transparent region, a second transparent region and a first semiconductor pattern partially overlapping the first transparent region; and
   a plurality of second pixels configured on even rows of the non-rectangular pixel regions, and each of the non-rectangular pixel regions has at least one non-90 degree angles, wherein each of the second pixels has a third transparent region, a fourth transparent region and a second semiconductor pattern partially overlapping the fourth transparent region, and, in any two adjacent first pixel and second pixel, the first transparent region and the third transparent region are mirror images of each other and the second transparent region and the fourth transparent region are mirror images of each other, and, in the adjacent first pixel and second pixel in any two rows, a transmittance loss at any position along a row direction of the odd rows and the even rows due to a portion of the first semiconductor pattern overlapping the first transparent region and due to a portion of the second semiconductor pattern overlapping the fourth transparent region remains unchanged, wherein the first transparent regions, the second transparent regions, the third transparent regions and the fourth transparent regions are trapezoid-like transparent regions, wherein each of the trapezoid-like transparent regions has an upper bottom, a lower bottom, two bevel edges and a first minor line segment and a second minor line segement, wherein the first minor line segment is connected between the upper bottom and one of the bevel edges, and the second minor line segment is conneted between the lower bottom and the one of the bevel edges.

2. The three-dimensional display of claim 1, wherein an extending direction of each of the lenticular lenses is perpendicular to the row direction.

3. The three-dimensional display of claim 1, wherein the display panel includes a liquid crystal display panel.

4. The three-dimensional display of claim 1, wherein the data lines tortuously extend along the row direction and the scan lines tortuously extend along a column direction perpendicular to the row direction.

5. The three-dimensional display of claim 1 further comprising a plurality of common lines, wherein each of the common lines is configured between two adjacent scan line.

6. The three-dimensional display of claim 1, wherein each of the first semiconductor patterns is electrically connected to one of the data lines, and each of the second semiconductor patterns is electrically connected to one of the data lines.

7. The three-dimensional display of claim 6, further comprising a plurality of common lines, wherein each of the common lines is configured between two adjacent scan line, wherein each of the first semiconductor patterns has a first capacitor electrode, and each of the second semiconductor patterns has a second capacitor electrode, and the first capacitor electrode and the second capacitor electrode respectively is coupled to the common line to form a storage capacitor.

8. The three-dimensional display of claim 1, wherein the first pixel configured between the Nth data line and the (N−1)th data line is electrically connected to the (N+1)th data line.

9. The three-dimensional display of claim 8, wherein the second pixel configured between the Mth data line and the (M−1)th data line is electrically connected to the (M+1)th data line, and N is even number when M is odd number, and N is odd number when M is even number.

10. A three-dimensional display, comprising:
a parallax barrier including a plurality of slits extending along directions parallel to each other;
a display panel configured under the parallax barrier, wherein the display panel includes:
a plurality of scan lines and a plurality of data lines, wherein the scan lines interlace the data lines to define a plurality of non-rectangular pixel regions;
a plurality of first pixel configured on odd rows of the non-rectangular pixel regions, wherein each of the first pixels has a first transparent region, a second transparent region and a first semiconductor pattern partially overlapping the first transparent region; and
a plurality of second pixel configured on even rows of the non-rectangular pixel regions, and each of the non-rectangular pixel regions has at least one non-90 degree angles, wherein each of the second pixels has a third transparent region, a fourth transparent region and a second semiconductor pattern partially overlapping the fourth transparent region, and, in any two adjacent first pixel and second pixel, the first transparent region and the third transparent region are mirror images of each other and the second transparent region and the fourth transparent region are mirror images of each other, and, in the adjacent first pixel and second pixel in any two rows, a transmittance loss at any position along a row direction of the odd rows and the even rows due to a portion of the first semiconductor pattern overlapping the first transparent region and due to a portion of the second semiconductor pattern overlapping the fourth transparent region remains unchanged, wherein the first transparent regions, the second transparent regions, the third transparent regions and the fourth transparent regions are trapezoid-like transparent regions, wherein each of the trapezoid-like transparent regions has an upper bottom, a lower bottom, two bevel edges and a first minor line segment and a second minor line segment, wherein the first minor line segment is connected between the upper bottom and one of the bevel edges, and the second minor line segment is connected between the lower bottom and the one of the bevel edges.

11. The three-dimensional display of claim 10, wherein an extending direction of each of the slits is perpendicular to the row direction.

12. The three-dimensional display of claim 10, wherein the display panel includes a liquid crystal display panel.

13. The three-dimensional display of claim 10, wherein the data lines tortuously extend along the row direction and the scan lines tortuously extend along a column direction perpendicular to the row direction.

14. The three-dimensional display of claim 10 further comprising a plurality of common lines, wherein each of the common lines is configured between two adjacent scan liens.

15. The three-dimensional display of claim 10, wherein each of the first semiconductor patterns is electrically connected to one of the data lines, and each of the second semiconductor patterns is electrically connected to one of the data lines.

16. The three-dimensional display of claim 15, further comprising a plurality of common lines, wherein each of the common lines is configured between two adjacent scan line, wherein each of the first semiconductor patterns has a first capacitor electrode, and each of the second semiconductor patterns has a second capacitor electrode, and the first capacitor electrode and the second capacitor electrode respectively is coupled to the common line to form a storage capacitor.

17. The three-dimensional display of claim 10, wherein the first pixel configured between the Nth data line and the (N−1)th data line is electrically connected to the (N+1)th data line.

18. The three-dimensional display of claim 17, wherein the second pixel configured between the Mth data line and the (M−1)th data line is electrically connected to the (M+1)th data line, and N is even number when M is odd number, and N is odd number when M is even number.

\* \* \* \* \*